United States Patent Office 2,792,430
Patented May 14, 1957

2,792,430

PRODUCTION OF PHENOLIC COMPOUNDS

Lee M. Porter, Concord, and Frederick F. Rust, Orinda, Calif., assignors to Shell Development Company, New York, N. Y., a corporation of Delaware No Drawing. Application November 28, 1955,
Serial No. 549,535

11 Claims. (Cl. 260—621)

This invention relates to the production of unsubstituted hydroxy aromatic compounds from the corresponding unsubstituted aromatic hydrocarbons. It relates more particularly to improvements in the conversion of benzene to phenol.

The phenolic compounds, of which phenol is the lowest member, find wide use as starting or intermediate materials in the production of highly important chemical products. Phenol, for example, is used in the production of resins, insecticides, pharmaceuticals, etc. The use of this compound in increasing fields of application has stressed the need for processes enabling its production with a minimum of operative steps from benzene. Processes disclosed heretofore wherein aromatics are contacted with molecular oxygen under pyrolytic conditions generally result in the obtaining of oxidation products which, even at temperatures at which substantial decomposition of the charge is unavoidably encountered, contain relatively small amounts of phenol. Attempts to bring the production of phenol by such processes within the realm of practicality by the use of catalysts has heretofore generally been unsuccessful. This has occasioned resort to more elaborate processes wherein increase in yield is offset to a substantial degree by increase in cost as a result of the number and complexity of operative steps involved.

Hydrogen peroxide, now made available at relatively low cost by recent developments, presents a potential source for the hydroxyl groups of the desired phenolic compounds. However, it is found, as disclosed and claimed in copending application Serial No. 455,756, filed September 13, 1954, that reaction of this material with hydrocarbons at elevated temperatures generally results in the obtaining of a product consisting predominantly of a dehydro-dimer and/or higher boiling derivatives of the starting hydrocarbon material. This is exemplified by the following examples.

Example 1

In a continuous operation, benzene was preheated and the resulting benzene vapors were passed into an externally heated mixing chamber maintained at a temperature of about 180° C. Aqueous 30% hydrogen peroxide was introduced as a continuous stream into the mixing chamber. From the mixing chamber the resulting mixed benzene-hydrogen peroxide vapors were passed through an externally heated tubular reactor maintained at 460° C. Surfaces of the apparatus in contact with the reactants were glass which had been pacified by treatment with boric acid. The benzene and aqueous hydrogen peroxide were charged at a rate providing a 10:1 molar ratio of benzene to hydrogen peroxide, respectively, in the vaporized feed entering the tubular reactor, and a contact time of 16 seconds. 84% of the hydrogen peroxide entered into reaction. Reaction products comprised phenol and biphenyl. The yield of phenol and biphenyl obtained was 4.3% and 37%, respectively, based on hydrogen peroxide reacted.

It is an object of the present invention to provide an improved process enabling the more efficient production of unsubstituted hydroxy aromatic compounds from readily available unsubstituted aromatic hydrocarbons and hydrogen peroxide.

Another object of the invention is the provision of an improved process enabling the more efficient production of unsubstituted hydroxy aromatic compounds from corresponding unsubstituted aromatic hydrocarbons and hydrogen peroxide without solid catalysts.

A specific object of the invention is the provision of an improved process enabling the more efficient production of reaction products comprising phenol from benzene and hydrogen peroxide. Other objects and advantages of the invention will become apparent from the following detailed description thereof.

It has now been found that unsubstituted aromatic hydrocarbons can be converted to the corresponding unsubstituted hydroxy aromatic compounds with the aid of hydrogen peroxide with the preclusion of any substantial formation of dimers and higher boiling hydrocarbon by-products by reacting the aromatic hydrocarbons with hydrogen peroxide in the presence of added molecular oxygen.

In accordance with the present invention unsubstituted aromatic hydrocarbons are reacted with hydrogen peroxide in the vapor phase, in the absence of solid catalysts, in the presence of added molecular oxygen at a temperature of from about 400° C. to about 600° C. Benzene is converted directly to phenol-containing reaction products by reaction with hydrogen peroxide in the vapor phase in the presence of added molecular oxygen.

The hydrocarbons converted to phenolic compounds in accordance with the invention are the unsubstituted aromatic hydrocarbons comprising, for example, benzene, biphenyl, naphthalene, etc. The aromatic hydrocarbon charge to the process of the invention need not be pure and may comprise lesser amounts of other hydrocarbons which are either inert under the reaction conditions or which do not interfere to any substantial degree with the desired reaction of the aromatic components. The charge to the process may comprise two or more aromatic hydrocarbons in admixture with one another. Suitable aromatic charge materials comprise the commercially available unsubstituted aromatic hydrocarbons.

The aromatic hydrocarbons may, if desired, be subjected to suitable conventional purifying and treating conditions to effect the removal of impurities and undesired hydrocarbon components therefrom prior to subjection to the process of the invention.

The hydrogen peroxide employed in the process of the invention may be obtained from any suitable source. It need not be in pure state and impurities such as, for example, those encountered in commercially available hydrogen peroxide do not adversely affect the reaction. Suitable hydrogen peroxide comprises the aqueous hydrogen peroxides of commerce.

The oxygen employed in the process of the invention is in molecular form and may comprise relatively pure oxygen or a molecular oxygen-containing gas such as air.

In accordance with the invention the reactants comprising the aromatic hydrocarbon and the hydrogen peroxide, and the added molecular oxygen, are mixed in the vapor state at an elevated temperature, but below the temperature at which any substantial decomposition of hydrogen peroxide or interaction of the reactants will take place. Thereafter, the vaporous mixture is brought to reaction temperature. Mixing of the reactants is preferably effected at a temperature in the range of from about 100° C. to about 300° C., and preferably from about 170° C. to about 200° C. The vaporized mixture of reactants thus preheated is brought to reaction temperature in the range of from about 400° C. to about 600° C., and preferably from about 460° C. to about 540° C.

In a preferred method of carrying out the invention the reactants are preheated and mixed, by preheating the aromatic hydrocarbon to be converted and introducing the aqueous hydrogen peroxide into the preheated aromatic hydrocarbon. In this wise, rapid heating of the hydrogen peroxide occurs in the absence of any substantial decomposition thereof. Under such conditions of mixing any adverse surface catalysis effect of the wall of the apparatus will generally be maintained at a minimum.

In a preferred method of executing the process of the invention, the aromatic hydrocarbon charge, for example, benzene, is preheated to a temperature of from about 170° C. to about 200° C., and introduced in continuous stream without undergoing any substantial cooling, into an externally heated mixing chamber; the mixing chamber being maintained at a temperature of from about 170° C. to about 200° C. Hydrogen peroxide, for example, liquid aqueous 30% hydrogen peroxide and molecular oxygen are continuously introduced into the mixing chamber. The resulting vaporized mixture, comprising benzene, hydrogen peroxide and oxygen, is passed directly and continuously, without undergoing any substantial cooling, into a reaction zone comprising, for example, an externally heated tubular reactor. The reactor is maintained at a temperature of, for example, from about 460° C. to about 540° C.

Although the molecular oxygen is preferably introduced into the mixing chamber, a part or all thereof may be charged to one or more points along the length of the reactor. In such case the molecular oxygen entering the reactor directly is preferably preheated to aid in maintaining the desired temperature therein.

A particular advantage of the process of the invention resides in the absence of any need for solid catalyst and/or reactor packing. Preferred reaction zones comprise apparatus providing a relatively high volume to wall surface area. Surfaces of the apparatus comprising the mixing zone and reaction zone are preferably of materials effecting little, if any, catalytic surface effect upon the reaction mixture in contact therewith. Preferred surface materials comprise, for example, glass, porcelain, ceramic, and the like. Metal surfaces including ferrous metals, such as, stainless steel, nickel, etc., though less desirable, may be employed. These are preferably treated to minimize any surface catalysis effect, for example, by passivation with suitable mineral acids, such as phosphoric acid, and the like. Smooth surfaced materials such as, for example, glass, glazed ceramic, etc., are preferably pretreated with a suitable passifying agent such as, for example, boric acid, sodium pyrophosphate, sodium metastannate, etc.

The process is preferably executed at substantially atmospheric pressure. Subatmospheric and superatmospheric pressures may, however, be employed within the scope of the invention. The mixing of the components of the charge may be effected at a pressure differing from that employed in the execution of the reaction.

The relative amounts in which the separate components of the charge are introduced into the system may vary considerably within the scope of the invention. In general, a substantial molar excess of aromatic hydrocarbon over the total amount of hydrogen peroxide and molecular oxygen in the charge to the system is maintained. A rate of feed such that the charge entering the reactor contains a mol ratio of aromatic hydrocarbon to hydrogen peroxide in the range of from about 1:1 to about 20:1 may suitably be employed. Preferred is the maintenance of a mol ratio of aromatic hydrocarbon to hydrogen peroxide in the reactor feed in the range of from about 8:1 to about 12:1.

Although a desirable effect upon the course of the reaction will be obtained when introducing the molecular oxygen into the process in relatively small amounts, for example, equimolar and lesser amounts based upon the hydrogen peroxide charged, it is preferred to execute the invention with the maintenance of the molar concentration of molecular oxygen in the feed in excess of the hydrogen peroxide concentration but below that of the aromatic hydrocarbon concentration. A suitable range of concentration of the molecular oxygen in the feed is one ranging, for example, from a mol ratio of molecular oxygen to hydrogen peroxide of from about 0.5:1 to about 20:1; a molar ratio in the range of 4:1 to 6:1 being particularly preferred.

The reaction of the invention is carried out with a relatively short contact time ranging, for example, from about 0.5 second to about 20 seconds, and preferably from about 1 second to about 12 seconds. Shorter or longer reaction times may, however, be employed within the scope of the invention.

Under the above conditions unsubstituted aromatic hydrocarbons are converted to reaction products comprising substantial amounts of the hydroxy-aromatic hydrocarbon compounds corresponding to the aromatic hydrocarbons charged. For example, benzene is converted to phenol; biphenyl to 4,4'-dihydroxydiphenyl; napthalene to naphthol; etc.

Effluence from the reactor may be cooled by suitable means, for example, by direct contact with a suitable quenching medium. The effluent stream from the reactor may be quenched, for example, by direct contact with a suitable liquid such as, for example, water. Cooled reactor effluent comprising the desired phenolic compounds is subjected to suitable product separating means to recover the desired phenolic compound therefrom. Such product separating means may comprise one or more such steps as, for example, vaporization, steam distillation, stripping, extraction, adsorption and the like. Unreacted components comprising aromatic hydrocarbon, and oxygen-containing gas may be recycled to the reaction zone.

The following examples are illustrative of the present invention.

*Example II*

The operation of the foregoing Example I was repeated under substantailly identical conditions but with the exception that oxygen was also introduced continuously into the mixing chamber and the rate of feed of the reactants was controlled to obtain a molar ratio of benzene:oxygen:hydrogen peroxide of 8.5:4.6:1, respectively, in the vaporized mixture entering the tubular reactor from the mixing chamber with a contact time of 12 seconds. 96% of the hydrogen peroxide charged entered into reaction. The reaction products comprised phenol and biphenyl. The yield of these products based upon hydrogen peroxide reacted was 36% of phenol and 6% of biphenyl. This is an 8.4 fold increase in the yield of phenol and a 6.2 fold decrease in the yield of biphenyl over that obtained in the foregoing operation of Example I wherein oxygen was not used in addition to hydrogen peroxide. Based upon benzene reacted the yields obtained in the operation using both hydrogen peroxide and oxygen were 46% of phenol, 15.4% of biphenyl, and about 38.8% normally gaseous products.

Normally gaseous or liquid materials capable of functioning as diluents and/or solvents for reactants or products in the process of the invention and which are substantially inert under the reaction conditions employed may be introduced into the system. The use of such materials may be resorted to to maintain the desired operating conditions of temperature, throughput rates, etc. Such suitable material comprises, for example, nitrogen, carbon dioxide, steam, etc.

Example III

The operation of the foregoing Example II was repeated under substantially identical conditions but with the exception that water vapor was also continuously introduced into the mixing chamber and the tubular reactor was maintained at a temperature of 550° C. The reactants and water vapor were charged to the process in a mol ratio of benzene:oxygen:hydrogen peroxide:water vapor of 10:5.8:1:63, respectively. A reaction time of 0.9 second was employed and resulted in 88.5% of the hydrogen peroxide reacting. The phenol yield based on hydrogen peroxide reacted was 45%.

The operation was repeated with the exception that hydrogen peroxide was omitted from the charge. In this case conversion of the benzene to phenol and biphenyl was reduced by more than 90%.

Example IV

The operation of foregoing Example III was repeated in a plurality of operations under substantially identical conditions but with the exception that the temperature in the reactor was varied in the range of from 475° C. to 550° C. Charge rates were controlled to allow 70% to 90% of the hydrogen peroxide to react. Phenol was obtained with yields ranging from 40% to 60% based on hydrogen peroxide entering reaction.

Example V

The operation of the foregoing Example IV was repeated under substantially identical conditions but with the exception that the tubular reactor was maintained at 570° C. and water vapor was charged in a mol ratio of $H_2O:O_2$ of 204:1. The mol ratio of benzene to oxygen to hydrogen peroxide charged was maintained at 18:13:1. The yield of phenol obtained was 74% on hydrogen peroxide reacted.

Example VI

Phenol was produced by reacting benzene with hydrogen peroxide in the presence of added water vapor substantially as described in the foregoing Example III with the exception that air was substituted for oxygen, materials were charged to the process in a mol ratio of benzene:air:hydrogen peroxide:water vapor of 10.8:12.51:1:137, respectively, and a reaction temperature of 575° C. and reaction time of 2.7 seconds, were employed. 90% of the hydrogen peroxide was reacted with a yield of phenol based on hydrogen peroxide reacted of 60%.

Similarly, naphthols are obtained by reacting naphthalene with hydrogen peroxide in the presence of added molecular oxygen under the conditions of the foregoing Examples II, III, IV, V and VI.

We claim as our invention:

1. The process for converting an unsubstituted aromatic hydrocarbon selected from the group consisting of benzene and naphthalene to the corresponding unsubstituted hydroxy aromatic compound which comprises reacting said aromatic hydrocarbon in the absence of a catalyst in the vapor phase with hydrogen peroxide in the presence of added molecular oxygen at a temperature of from about 400° C. to about 600° C.

2. The process for converting an unsubstituted aromatic hydrocarbon selected from the group consisting of benzene and naphthalene to the corresponding unsubstituted hydroxy aromatic compound, which comprises reacting said aromatic hydrocarbon in the absence of a catalyst in the vapor phase with hydrogen peroxide in a mol ratio of said aromatic hydrocarbon to said hydrogen peroxide of from about 1:1 to about 20:1, in the presence of molecular oxygen added in a mol ratio of oxygen to hydrogen peroxide of about 0.5:1 to about 20:1, at a temperature of from about 400° C. to about 600° C.

3. The process in accordance with claim 2 wherein said reaction is executed at a temperature of from about 460° C. to about 540° C.

4. The process for converting benzene to phenol-containing reaction products which comprises reacting said benzene in the absence of a catalyst with hydrogen peroxide in the vapor phase at a temperature of from about 400° C. to about 600° C. in the presence of added molecular oxygen.

5. The process for converting a benzene to phenol-containing reaction product which comprises reacting said benzene in the absence of a catalyst with hydrogen peroxide in the vapor phase, in a mol ratio of benzene to hydrogen peroxide of about 1:1 to about 20:1, in the presence of an amount of molecular oxygen equal to from about 0.5 to about 20 times the molar amount of hydrogen peroxide, at a temperature of from about 400° C. to about 600° C.

6. The process in accordance with claim 5 wherein said benzene is reacted with said hydrogen peroxide in a mol ratio of benzene to hydrogen peroxide of from about 8:1 to about 12:1 in the presence of an amount of molecular oxygen equal to from about 4 to about 6 times the amount of hydrogen peroxide, at a temperature of from about 460° C. to about 540° C.

7. The process for producing phenolic compound-containing reaction mixtures which comprises preheating an unsubstituted aromatic hydrocarbon selected from the group consisting of benzene and naphthalene in the absence of a catalyst to a temperature of from about 100° C. to about 300° C., introducing hydrogen peroxide into said preheated aromatic hydrocarbon, and heating the resulting mixture at a temperature of from about 400° C. to about 600° C. in the presence of added molecular oxygen.

8. The process for the production of unsubstituted hydroxy aromatic compound-containing reaction mixtures which comprises preheating an unsubstituted aromatic hydrocarbon selected from the group consisting of benzene and naphthalene in the absence of a catalyst with hydrogen peroxide, in a mol ratio of said aromatic hydrocarbon to hydrogen peroxide of from about 1:1 to about 20:1, to a temperature of from about 100° C. to about 300° C., in the presence of an amount of added molecular oxygen equal to about 0.5 to about 20 times the molar amount of hydrogen peroxide, and heating the resulting preheated mixture at a temperature of from about 400° C. to about 600° C.

9. The process for converting benzene to phenol-containing reaction products which comprises preheating said benzene in the absence of a catalyst to a temperature of from about 100° C. to about 300° C., introducing hydrogen peroxide and molecular oxygen into said preheated benzene, and heating the resulting preheated mixture comprising benzene, hydrogen peroxide and molecular oxygen at a temperature in the range of from about 400° C. to about 600° C.

10. The process in accordance with claim 9 wherein said benzene and hydrogen peroxide are subjected to said preheating in a mol ratio of benzene to hydrogen peroxide of from about 1:1 to about 20:1 in the presence of molecular oxygen added in an amount of from about 0.5 to about 20 times the molar amount of hydrogen peroxide charged.

11. The process in accordance with claim 9 wherein said benzene and hydrogen peroxide are subjected to said preheating in a mol ratio of benzene to hydrogen peroxide of from about 8:1 to about 12:1 in the presence of molecular oxygen added in an amount of from about 4 to about 6 times the molar amount of hydrogen peroxide charged.

References Cited in the file of this patent

UNITED STATES PATENTS

| | | |
|---|---|---|
| 2,199,585 | Bone et al. | May 7, 1940 |
| 2,223,383 | Moyer et al. | Dec. 3, 1940 |
| 2,437,648 | Milas | Mar. 9, 1948 |